(12) United States Patent
Chandramohan et al.

(10) Patent No.: US 8,695,069 B1
(45) Date of Patent: Apr. 8, 2014

(54) SESSION MANAGEMENT BETWEEN A WEB APPLICATION AND A CRM SYSTEM

(75) Inventors: Rajagopal Chandramohan, San Diego, CA (US); Rajkumar Ramakrishnan, San Diego, CA (US); Jeffery W. Kester, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 100 days.

(21) Appl. No.: 13/362,609

(22) Filed: Jan. 31, 2012

(51) Int. Cl.
*H04L 29/06* (2006.01)

(52) U.S. Cl.
USPC .................................................. 726/6; 726/12

(58) Field of Classification Search
None
See application file for complete search history.

(56) References Cited

U.S. PATENT DOCUMENTS

| | | | | |
|---|---|---|---|---|
| 6,910,180 | B1* | 6/2005 | Cui et al. ....................... | 715/201 |
| 7,523,159 | B1* | 4/2009 | Williams et al. .............. | 709/203 |
| 2004/0015727 | A1* | 1/2004 | Lahti et al. .................... | 713/201 |
| 2007/0157304 | A1* | 7/2007 | Logan et al. ................... | 726/12 |
| 2008/0022383 | A1* | 1/2008 | Bobde et al. ................... | 726/10 |
| 2010/0095121 | A1* | 4/2010 | Shetty et al. .................. | 713/170 |
| 2010/0332665 | A1* | 12/2010 | Jolfaei ............................ | 709/228 |
| 2011/0167470 | A1* | 7/2011 | Walker et al. ................... | 726/1 |
| 2011/0296036 | A1* | 12/2011 | Canning et al. ............... | 709/228 |
| 2012/0066731 | A1* | 3/2012 | Vasquez et al. ............... | 725/106 |

* cited by examiner

*Primary Examiner* — Gilberto Barron, Jr.
*Assistant Examiner* — Abdulhakim Nobahar
(74) *Attorney, Agent, or Firm* — Park, Vaughan, Fleming & Dowler LLP

(57) ABSTRACT

Embodiments of the present invention provide a system that facilitates session management between a web application and a Customer Relationship Management (CRM) system. During operation, the system receives, at a proxy, a service call intended for a CRM system. Next, the system modifies a header of the service call to include authentication credentials for the CRM system. The system then determines if an available session token for the CRM system exists at the proxy. If so, the system modifies the header of the service call to include the session token. Next, the system forwards the service call with the modified header to the CRM system. The system then receives a response to the service call, which includes the session token. Upon receiving the response, the system stores the session token at the proxy for a subsequent service call. Finally, the system forwards the response to the web application.

18 Claims, 4 Drawing Sheets

SESSION MANAGEMENT BETWEEN A WEB APPLICATION AND A CRM SYSTEM

BACKGROUND

Related Art

Most Customer Relationship Management (CRM) systems allow outside applications and services to issue requests via an established framework. These requests typically include authentication information for establishing a session with the CRM system. Once a session is established, subsequent requests associated with the session take less time to process because the time to establish the session is eliminated. However, this presents additional problems for some web applications.

For example, in order to take advantage of the established session, web applications typically need to be aware of the session, and to actively manage the session. In this example, these web applications would need to identify the session by an identifier, such as a token, and to pass the identifier back to the CRM system in subsequent requests. This process adds quite a bit of complexity to these web applications. Furthermore, this problem is compounded if many different web services that are part of the same web application make individual requests to the CRM system.

SUMMARY

One embodiment of the present invention provides a system that facilitates session management between a web application and a Customer Relationship Management (CRM) system. During operation, the system receives, at a proxy from a web application, a service call intended for a CRM system. Next, the system modifies a header of the service call, at the proxy, to include authentication credentials for the CRM system. The system then determines if an available session token for the CRM system exists at the proxy. If so, the system modifies the header of the service call to include the session token. Next, the system forwards the service call with the modified header to the CRM system. The system then receives, at the proxy from the CRM system, a response to the service call, which includes the session token. Upon receiving the response, the system stores the session token at the proxy for a subsequent service call to the CRM system. Finally, the system forwards the response to the web application.

In some embodiments of the present invention, receiving the service call intended for the CRM system involves receiving the service call via Uniform Resource Locator (URL) redirection.

In some embodiments of the present invention, the system determines if a maximum number of session tokens has been generated. If so, the system queues the service call until a session token becomes available.

In some embodiments of the present invention, the system determines if a time span of a specific session token has exceeded a pre-determined limit. If so, the system eliminates the specific session token.

In some embodiments of the present invention, the system determines if a number of available session tokens has reached a pre-determined threshold. If so, the system eliminates one or more of the available session tokens.

In some embodiments of the present invention, the proxy is an Enterprise Java Bean (EJB) Stateless Session bean.

In some embodiments of the present invention, each EJB instance manages a single session with the CRM system.

DETAILED DESCRIPTION

Figure 1:
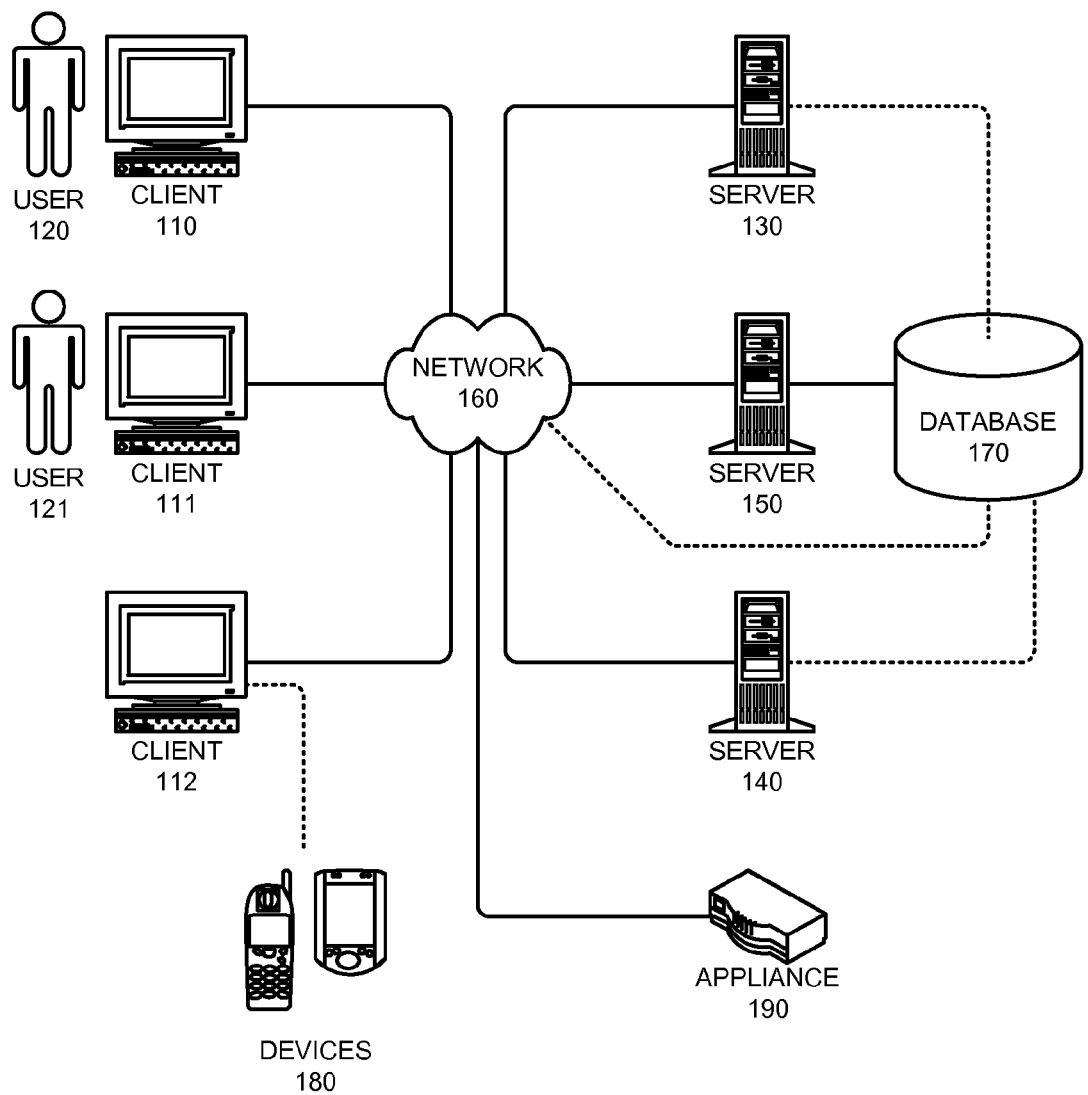
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. Note that the term "non-transitory computer-readable storage medium" comprises all computer-readable media, with the sole exception of a propagating electromagnetic signal.

The methods and processes described in the detailed description section can be embodied as code and/or data, which can be stored on a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

One embodiment of the present invention provides a system that facilitates session management between a web application and a Customer Relationship Management (CRM) system. During operation, the system receives, at a proxy from a web application, a service call intended for a CRM system.

Note that the web application may be a stand-alone application, or may be a collection of applications utilizing a common framework. Also note that the proxy may be implemented as software, as hardware (such as an appliance), or as a combination of the two.

Next, the system modifies a header of the service call, at the proxy, to include authentication credentials for the CRM system. The system then determines if an available session token for the CRM system exists at the proxy. If so, the system modifies the header of the service call to include the session token. Next, the system forwards the service call with the modified header to the CRM system. The system then receives, at the proxy from the CRM system, a response to the service call, which includes the session token. Upon receiving the response, the system stores the session token at the proxy for a subsequent service call to the CRM system. Finally, the system forwards the response to the web application.

In some embodiments of the present invention, receiving the service call intended for the CRM system involves receiving the service call via Uniform Resource Locator (URL) redirection. URL redirection allows the proxy to be implemented with little or no change to the web application. In many instances, the proxy can be implemented in real-time without needing to bring down the system simply by modifying a configuration file that specifies the location of the CRM system. The configuration file would be modified to point to the proxy instead.

In some embodiments of the present invention, the system determines if a maximum number of session tokens has been generated. If so, the system queues the service call until a session token becomes available. For example, if the CRM system allowed only 20 simultaneous sessions, or if an administrator determined that 20 simultaneous sessions is the maximum allowed for performance reasons, the system may limit the maximum number of tokens to 20, and queue requests until busy tokens are returned in order not to exceed the limit.

In some embodiments of the present invention, the system determines if a time span of a specific session token has exceeded a pre-determined limit. If so, the system eliminates the specific session token. Note that many systems have a time-to-live (TTL) threshold on sessions. In some systems, this TTL threshold is reset every time the token is returned to the system, and in other systems, the TTL threshold is an absolute threshold from the time the token was initially created.

In some embodiments of the present invention, the system determines if a number of available session tokens has reached a pre-determined threshold. If so, the system eliminates one or more of the available session tokens. Note that resources are consumed to hold sessions open. If the proxy is holding on to tokens for a large number of sessions that are not being used, this could have a detrimental impact on the performance of the system. Thus, if the number of available tokens reaches this pre-determined threshold, the system may eliminate some sessions, thereby freeing up some system resources.

In some embodiments of the present invention, the proxy is an Enterprise Java Bean (EJB) Stateless Session bean. Note that, while EJBs are described herein for illustrative purposes, embodiments of the present invention are not meant to be limited to EJBs.

In some embodiments of the present invention, each EJB instance manages a single session with the CRM system. Note that by having a single EJB instance manage a single token, the proxy can ensure that concurrent requests will not be trying to access the same token.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, personal digital assistants (PDAs), smartphones, personal music players (such as MP3 players), gaming systems, digital cameras, video cameras, portable storage media, or any other device that can be coupled to the client. Note that, in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different system configurations, and are not limited to the system configuration illustrated in computing environment 100. In general, any device that is capable of communicating via network 160 may incorporate elements of the present invention.

System

Figure 2:
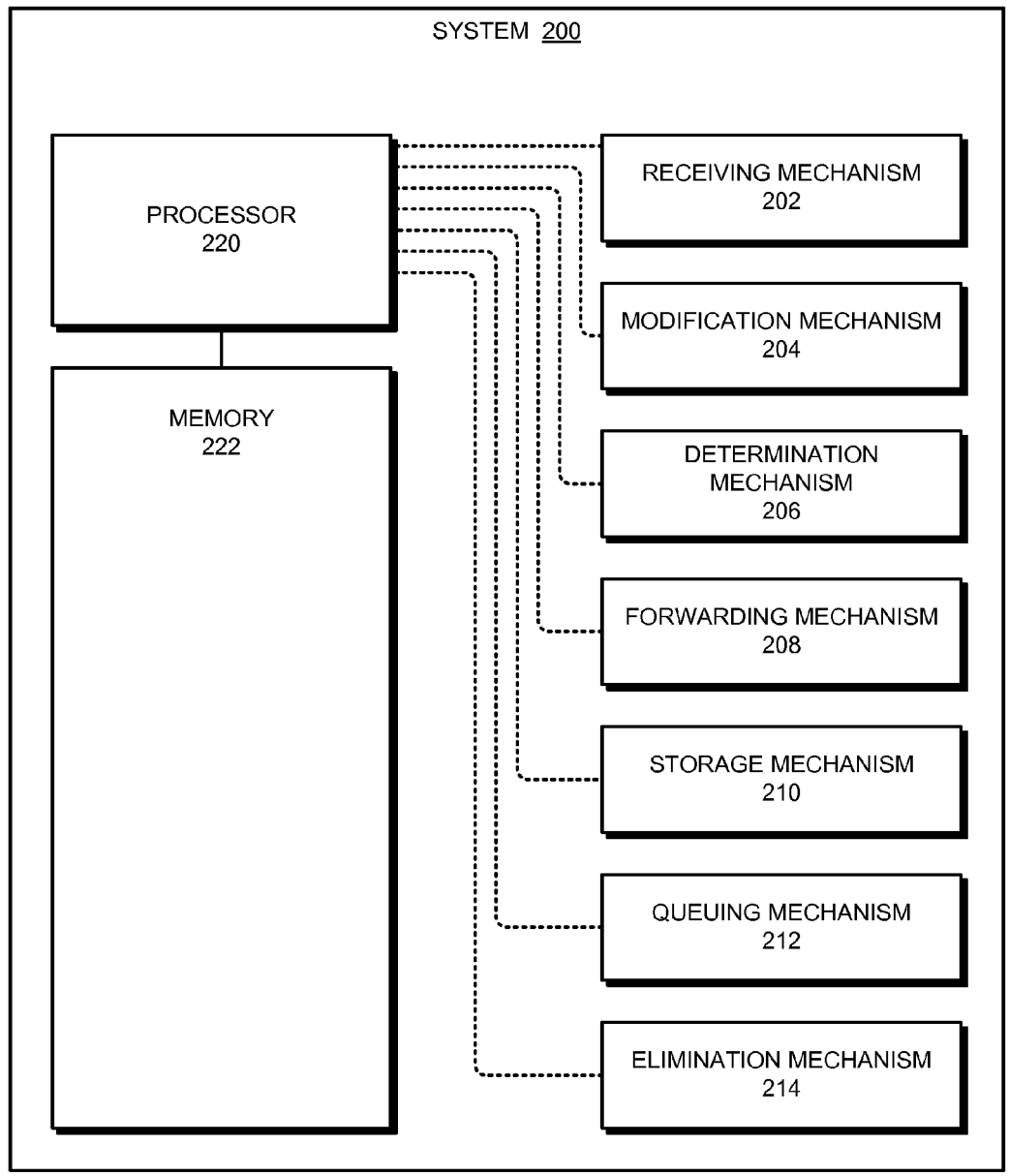
FIG. 2 illustrates a system in accordance with an embodiment of the present invention.

FIG. 2 illustrates a system 200 in accordance with an embodiment of the present invention. As illustrated in FIG. 2, system 200 can comprise server 150, database 170, appliance 190, client 110, devices 180, or any combination thereof. System 200 can also include receiving mechanism 202, modification mechanism 204, determination mechanism 206, forwarding mechanism 208, storage mechanism 210, queuing mechanism 212, elimination mechanism 214, processor 220, and memory 222.

Process Flow

Figure 3:
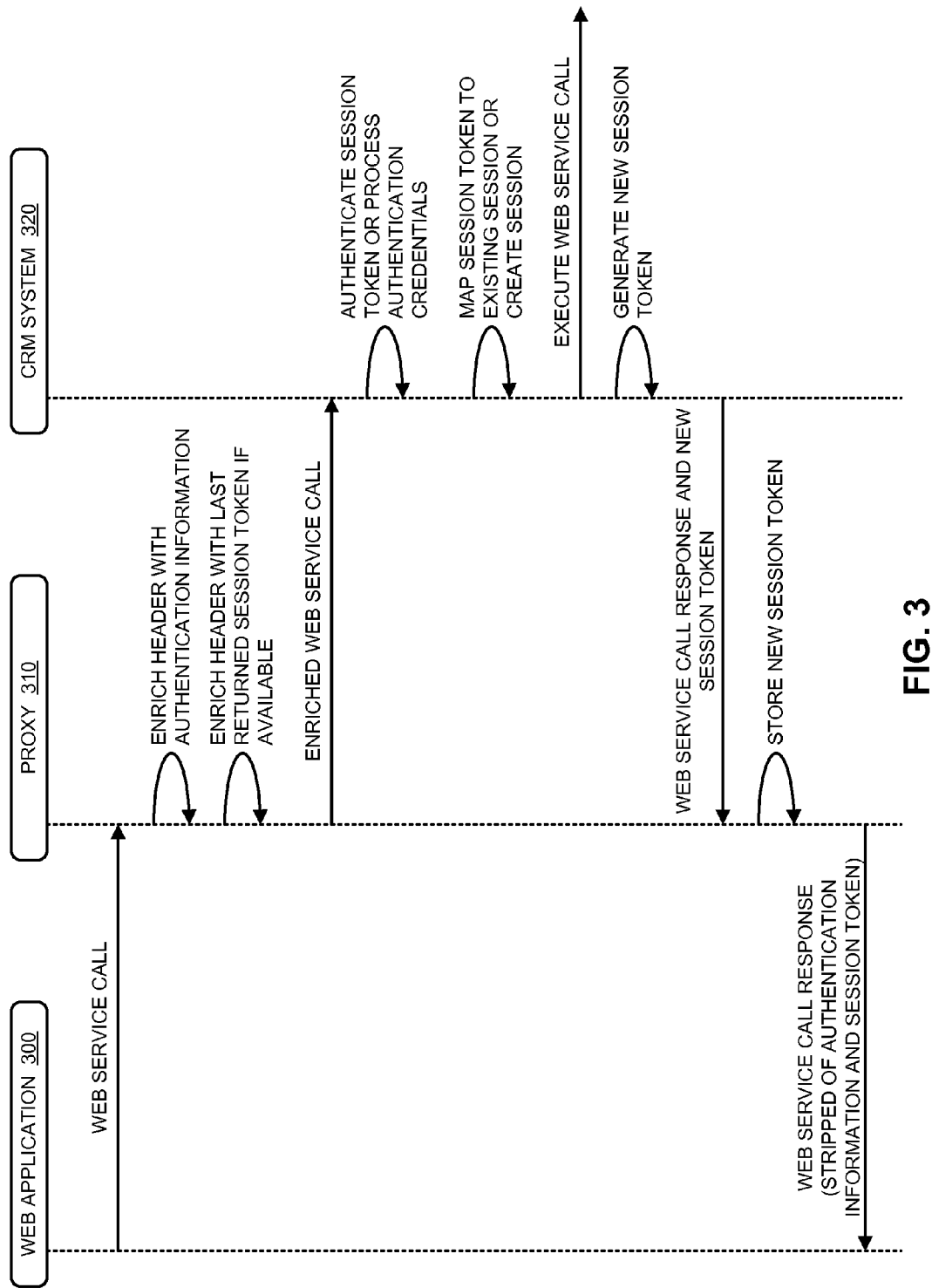
FIG. 3 illustrates a process flow in accordance with an embodiment of the present invention.

FIG. 3 illustrates a process flow in accordance with an embodiment of the present invention. As is illustrated in FIG. 3, proxy 310 sits between web application 300 and CRM system 320. When web application 300 sends a web service call to CRM system 320, proxy 310 intercepts the web service call. Note that, as described previously, the web service call may be intercepted via URL redirection, or any other means of interception.

Once proxy 310 has received the web service call, proxy 310 enriches the header of the web service call with authentication information for CRM system 320. This authentication information can include usernames, passwords, encryption keys, etc. Additionally, if a session token is available, proxy 310 enriches the header of the web service call with an available session token that has been returned from CRM system 320. Proxy 310 then forwards the web service call with the enriched headers to CRM system 320.

Upon receiving the web service call, CRM system 320 authenticates the session token if available, or processes the authentication information. Next, CRM system 320 maps the session token to an existing valid session, or creates a new session if necessary. Once a session is mapped, CRM system 320 executes the web service call, and generates a new session token. CRM system 320 then returns the web service call response and the new session token to proxy 310. Finally, proxy 310 stores the new session token and returns the web service call response, stripped of the authentication information and the session token, to web application 300.

Note that, in many embodiments, both web application 300 and CRM system 320 are unaware of the existence of proxy 310. Proxy 310 intercepts the web service call and brokers the transaction. No changes are necessary within web application 300 and CRM system 320, other than enabling a hook for redirection.

Process of Managing Sessions

Figure 4:
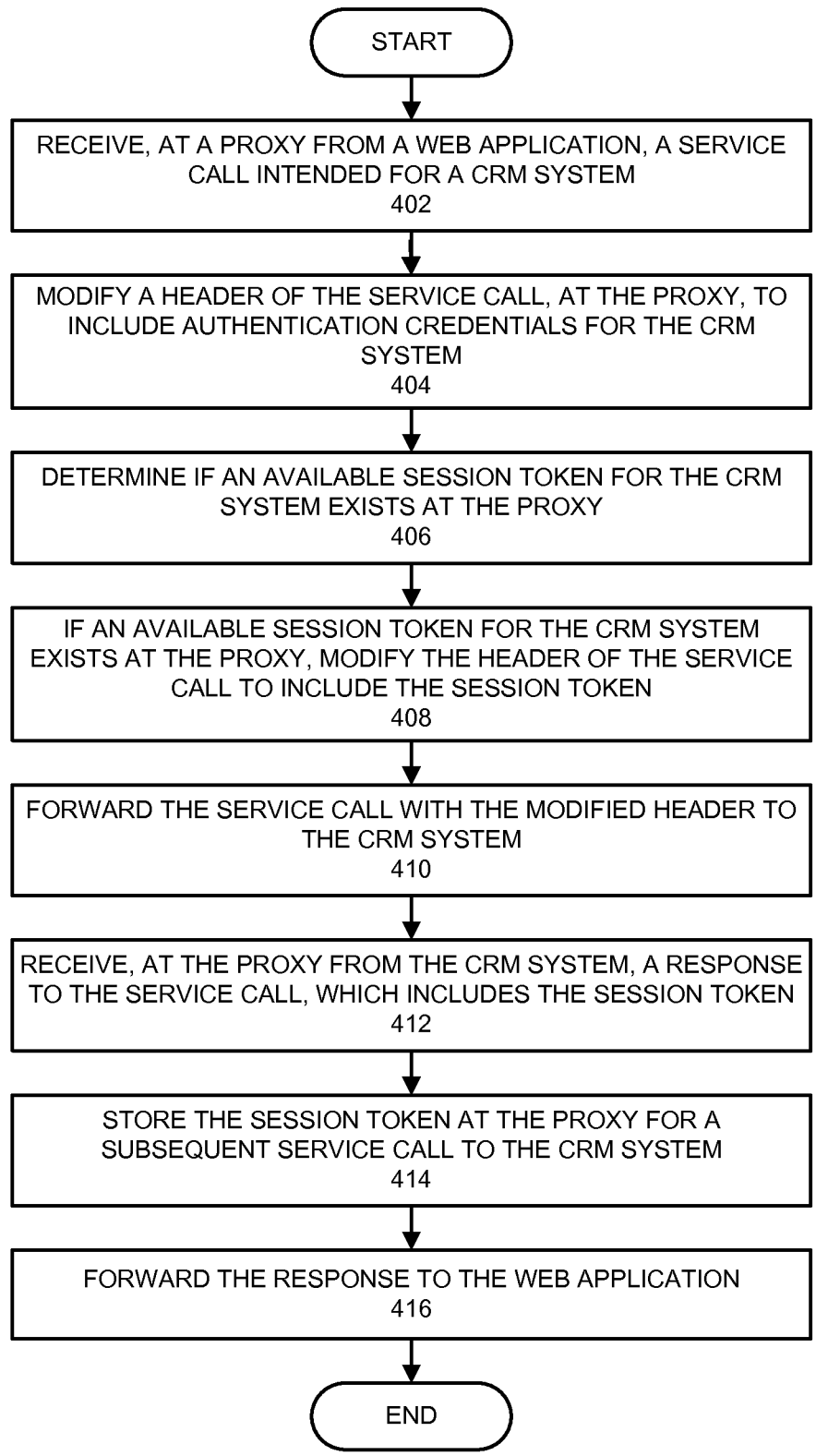
FIG. 4 presents a flow chart illustrating the process of managing sessions between a web application and a CRM system in accordance with an embodiment of the present invention.

FIG. 4 presents a flow chart illustrating the process of managing sessions between a web application and a CRM system in accordance with an embodiment of the present invention.

During operation, receiving mechanism 202 receives, at a proxy 310 from a web application 300, a service call intended for a CRM system 320 (operation 402). Next, modification mechanism 204 modifies a header of the service call, at proxy 310, to include authentication credentials for CRM system 320 (operation 404). Determination mechanism 206 then determines if an available session token for CRM system 320 exists at proxy 310 (operation 406). If an available session token for CRM system 320 exists at proxy 310, modification mechanism 204 modifies the header of the service call to include the session token (operation 408). Forwarding mechanism 208 then forwards the service call with the modified header to CRM system 320 (operation 410).

Receiving mechanism 202 receives, at proxy 310 from CRM system 320, a response to the service call, which includes the session token (operation 412). Storage mechanism 210 then stores the session token at proxy 310 for a subsequent service call to CRM system 320 (operation 414). Finally, forwarding mechanism 208 forwards the response to web application 300 (operation 416).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating session management between a web application and a Customer Relationship Management (CRM) system, the method comprising:
   receiving, at a proxy from a web application, a service call intended for a CRM system;
   modifying a header of the service call, at the proxy, to include authentication credentials for the CRM system;
   determining if an available session token for the CRM system exists at the proxy;
   if so, modifying the header of the service call to include the session token;
   determining if a maximum number of session tokens has been generated;
   if so, queuing the service call until a session token becomes available;
   forwarding the service call with the modified header to the CRM system;
   receiving, at the proxy from the CRM system, a response to the service call, which includes the session token;
   storing the session token at the proxy for a subsequent service call to the CRM system; and
   forwarding the response to the web application.

2. The computer-implemented method of claim 1, wherein receiving the service call intended for the CRM system involves receiving the service call via Uniform Resource Locator (URL) redirection.

3. The computer-implemented method of claim 1, further comprising:
   determining if a time span of a specific session token has exceeded a pre-determined limit; and
   if so, eliminating the specific session token.

4. The computer-implemented method of claim 1, further comprising:
   determining if a number of available session tokens has reached a pre-determined threshold; and
   if so, eliminating one or more of the available session tokens.

5. The computer-implemented method of claim 1, wherein the proxy is an Enterprise Java Bean (EJB) Stateless Session bean.

6. The computer-implemented method of claim 5, wherein each EJB instance manages a single session with the CRM system.

7. A non-transitory computer-readable storage medium storing instructions that when executed by a computer cause the computer to perform a method for facilitating session management between a web application and a Customer Relationship Management (CRM) system, the method comprising:
   receiving, at a proxy from a web application, a service call intended for a CRM system;
   modifying a header of the service call, at the proxy, to include authentication credentials for the CRM system;

determining if an available session token for the CRM system exists at the proxy;
if so, modifying the header of the service call to include the session token;
determining if a maximum number of session tokens has been generated;
if so, queuing the service call until a session token becomes available;
forwarding the service call with the modified header to the CRM system;
receiving, at the proxy from the CRM system, a response to the service call, which includes the session token;
storing the session token at the proxy for a subsequent service call to the CRM system; and
forwarding the response to the web application.

8. The non-transitory computer-readable storage medium of claim 7, wherein receiving the service call intended for the CRM system involves receiving the service call via Uniform Resource Locator (URL) redirection.

9. The non-transitory computer-readable storage medium of claim 7, wherein the method further comprises:
determining if a time span of a specific session token has exceeded a pre-determined limit; and
if so, eliminating the specific session token.

10. The non-transitory computer-readable storage medium of claim 7, wherein the method further comprises:
determining if a number of available session tokens has reached a pre-determined threshold; and
if so, eliminating one or more of the available session tokens.

11. The non-transitory computer-readable storage medium of claim 7, wherein the proxy is an Enterprise Java Bean (EJB) Stateless Session bean.

12. The non-transitory computer-readable storage medium of claim 11, wherein each EJB instance manages a single session with the CRM system.

13. An apparatus configured for facilitating session management between a web application and a Customer Relationship Management (CRM) system, comprising:
a memory;
a processor;
a receiving mechanism configured to receive, at a proxy from a web application, a service call intended for a CRM system;
a modification mechanism configured to modify a header of the service call, at the proxy, to include authentication credentials for the CRM system;
a determination mechanism configured to determine if an available session token for the CRM system exists at the proxy;
wherein the modification mechanism is further configured to modify the header of the service call to include the session token if an available session token for the CRM system exists at the proxy;
wherein the determination mechanism is further configured to determine if a maximum number of session tokens has been generated;
a queuing mechanism configured to queue the service call until a session token becomes available if a maximum number of session tokens has been generated;
a forwarding mechanism configured to forward the service call with the modified header to the CRM system;
wherein the receiving mechanism is further configured to receive, at the proxy from the CRM system, a response to the service call, which includes the session token;
a storage mechanism configured to store the session token at the proxy for a subsequent service call to the CRM system; and
wherein the forwarding mechanism is further configured to forward the response to the web application.

14. The apparatus of claim 13, wherein the receiving mechanism is further configured to receive the service call intended for the CRM system via Uniform Resource Locator (URL) redirection.

15. The apparatus of claim 13, further comprising:
wherein the determination mechanism is further configured to determine if a time span of a specific session token has exceeded a pre-determined limit; and
an elimination mechanism configured to eliminate the specific session token if the time span of the specific session token has exceeded the pre-determined limit.

16. The apparatus of claim 13, further comprising:
wherein the determination mechanism is further configured to determine if a number of available session tokens has reached a pre-determined threshold; and
an elimination mechanism configured to eliminate one or more of the available session tokens if the number of available session tokens has reached the pre-determined threshold.

17. The apparatus of claim 13, wherein the proxy is an Enterprise Java Bean (EJB) Stateless Session bean.

18. The apparatus of claim 17, wherein each EJB instance manages a single session with the CRM system.

* * * * *